US008860693B2

(12) United States Patent
Elias

(10) Patent No.: US 8,860,693 B2
(45) Date of Patent: Oct. 14, 2014

(54) IMAGE PROCESSING FOR CAMERA BASED MOTION TRACKING

(75) Inventor: John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 947 days.

(21) Appl. No.: 12/499,351

(22) Filed: Jul. 8, 2009

(65) Prior Publication Data
US 2011/0006991 A1 Jan. 13, 2011

(51) Int. Cl.
G06F 3/042 (2006.01)
G06F 3/041 (2006.01)
G06F 3/02 (2006.01)
G06F 1/16 (2006.01)

(52) U.S. Cl.
CPC ............ *G06F 3/0202* (2013.01); *G06F 1/1662* (2013.01); *G06F 3/0428* (2013.01)
USPC ......................................... 345/175

(58) Field of Classification Search
None
See application file for complete search history.

(56) References Cited

U.S. PATENT DOCUMENTS

| 5,341,133 | A |   | 8/1994  | Savoy et al. |         |
|-----------|---|---|---------|--------------|---------|
| 5,448,261 | A | * | 9/1995  | Koike et al. | 345/158 |
| 5,483,261 | A |   | 1/1996  | Yasutake     |         |
| 5,488,204 | A |   | 1/1996  | Mead et al.  |         |
| 5,707,160 | A | * | 1/1998  | Bowen        | 400/472 |
| 5,821,922 | A | * | 10/1998 | Sellers      | 345/157 |
| 5,825,352 | A |   | 10/1998 | Bisset et al.|         |
| 5,835,079 | A |   | 11/1998 | Shieh        |         |
| 5,864,334 | A | * | 1/1999  | Sellers      | 345/168 |
| 5,880,411 | A |   | 3/1999  | Gillespie et al. |     |
| 6,188,391 | B1|   | 2/2001  | Seely et al. |         |
| 6,204,839 | B1|   | 3/2001  | Mato, Jr.    |         |
| 6,310,610 | B1|   | 10/2001 | Beaton et al.|         |
| 6,313,825 | B1| * | 11/2001 | Gilbert      | 345/156 |
| 6,323,846 | B1|   | 11/2001 | Westerman et al. |    |
| 6,690,387 | B2|   | 2/2004  | Zimmerman et al. |    |
| 6,707,027 | B2| * | 3/2004  | Liess et al. | 250/221 |
| 6,710,767 | B1| * | 3/2004  | Hasegawa et al. | 345/157 |
| 6,791,531 | B1|   | 9/2004  | Johnston et al. |     |
| 6,803,906 | B1|   | 10/2004 | Morrison et al. |     |

(Continued)

FOREIGN PATENT DOCUMENTS

JP 2000-163031 A 6/2000
JP 2002-342033 A 11/2002

OTHER PUBLICATIONS

Fingerworks, TouchStream LP, http://fingerworks.com/ST_product.html; printed Nov. 13, 2008; (14) web pages.

(Continued)

*Primary Examiner* — Amare Mengistu
*Assistant Examiner* — Antonio Xavier
(74) *Attorney, Agent, or Firm* — Morrison & Foerster LLP

(57) ABSTRACT

Image processing techniques that can improve the user interface experience associated with key-based input devices. In one embodiment, a motion sensitive mechanical keyboard can utilize orthogonally-oriented cameras to sense hand/finger motion over the surface of the keys. This arrangement can enable a standard look and feel mechanical keyboard to receive command and cursor input (e.g., pointing and gestures) from the user without requiring the user to move the user's hand off the keyboard. The image processing techniques can be utilized to minimize or remove undesirable cursor movement that can occur based on certain detected hand/finger motion from such cameras, including looming and/or vertical motions for example.

16 Claims, 13 Drawing Sheets

(56) References Cited

U.S. PATENT DOCUMENTS

| | | | | |
|---|---|---|---|---|
| 7,015,894 | B2 | 3/2006 | Morohoshi | |
| 7,050,177 | B2* | 5/2006 | Tomasi et al. | 356/614 |
| 7,184,064 | B2 | 2/2007 | Zimmerman et al. | |
| 7,189,017 | B2* | 3/2007 | McLoone | 400/472 |
| 7,663,607 | B2 | 2/2010 | Hotelling et al. | |
| 8,479,122 | B2 | 7/2013 | Hotelling et al. | |
| 2002/0171633 | A1* | 11/2002 | Brinjes | 345/168 |
| 2003/0006973 | A1* | 1/2003 | Omura et al. | 345/175 |
| 2003/0071858 | A1* | 4/2003 | Morohoshi | 345/856 |
| 2005/0110769 | A1* | 5/2005 | DaCosta et al. | 345/173 |
| 2006/0026521 | A1 | 2/2006 | Hotelling et al. | |
| 2006/0097991 | A1 | 5/2006 | Hotelling et al. | |
| 2006/0188849 | A1* | 8/2006 | Shamaie | 434/85 |
| 2006/0190836 | A1 | 8/2006 | Ling Su et al. | |
| 2006/0197753 | A1 | 9/2006 | Hotelling | |
| 2006/0232557 | A1 | 10/2006 | Fallot-Burghardt | |
| 2007/0290993 | A1* | 12/2007 | Baudisch et al. | 345/157 |
| 2008/0225006 | A1 | 9/2008 | Ennadi | |
| 2008/0240507 | A1* | 10/2008 | Niwa et al. | 382/104 |
| 2009/0021488 | A1* | 1/2009 | Kali et al. | 345/173 |
| 2009/0160771 | A1* | 6/2009 | Hinckley et al. | 345/163 |
| 2009/0201261 | A1* | 8/2009 | Day | 345/173 |
| 2010/0188370 | A1* | 7/2010 | Morrison et al. | 345/175 |
| 2012/0327031 | A1* | 12/2012 | Fujioka | 345/175 |

OTHER PUBLICATIONS

Lifehacker, Hack Attack: Operate Your Mouse with Your Keyboard web pages, http://lifehacker.com/software/mouser/hack-attack-operate-your-own-mouse-with-your-keyboard-212816.php; printed Nov. 10, 2008; (4) web pages.

Du, H. et al. (Date Unknown). "A Virtual Keyboard Based on True-3D Optical Ranging," Swiss National Science Foundation Grant No. 620-066110, located at <http://www.bmva.ac.uk/bmvc/2005/papers/151/paper151.pdf>, last visited Jul. 2, 2009, 10 pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

IMAGE PROCESSING FOR CAMERA BASED MOTION TRACKING

FIELD OF THE DISCLOSURE

This relates generally to input devices for computing systems, and more particularly, to improving the user interface experience associated with key-based input devices.

BACKGROUND OF THE DISCLOSURE

A computer keyboard is a peripheral modeled after the typewriter keyboard. Keyboards are used to provide textual input into the computer and to control the operation of the computer. Physically, computer keyboards are generally an arrangement of rectangular or near-rectangular buttons or "keys," which typically have engraved or printed characters. In most cases, each depressing of a key corresponds to a single character. However, some characters require that a user depress and hold several keys concurrently or in sequence. Depressing and holding several keys concurrently or in sequence can also result in a command being issued that affects the operation of the computer, or the keyboard itself.

There are several types of keyboards, usually differentiated by the switch technology employed in their operation. The choice of switch technology can affect the keys' response (i.e., the positive feedback that a key has been depressed) and travel (i.e., the distance needed to push the key to enter a character reliably). One of the most common keyboard types is a "dome-switch" keyboard which works as follows. When a key is depressed, the key pushes down on a rubber dome sitting beneath the key. The rubber dome collapses, which gives tactile feedback to the user depressing the key, and causes a conductive contact on the underside of the dome to touch a pair of conductive lines on a Printed Circuit Board (PCB) below the dome, thereby closing the switch. A chip in the keyboard emits a scanning signal along the pairs of lines on the PCB to all the keys. When the signal in one pair of the lines changes due to the contact, the chip generates a code corresponding to the key connected to that pair of lines. This code is sent to the computer either through a keyboard cable or over a wireless connection, where it is received and decoded into the appropriate key. The computer then decides what to do on the basis of the key depressed, such as display a character on the screen or perform some action. Other types of keyboards operate in a similar manner, with the main differences being how the individual key switches work. Some examples of other keyboards include capacitive-switch keyboards, mechanical-switch keyboards, Hall-effect keyboards, membrane keyboards, roll-up keyboards, and so on.

Conventional mechanical keyboards are generally accepted as the preferred means to provide textual input. These keyboards have mechanical keys that are configured to move independently of one another and comply with standards for key spacing and actuation force. These keyboards are also arranged in the so-called QWERTY layout. Over the last forty years there have been numerous attempts made to introduce an alternative to the standard keyboard. The changes include, but are not limited to, non-QWERTY layouts, concave and convex surfaces, capacitive keys, split designs, membrane keys, etc. However, although such alternative keyboards may provide improved usability or ergonomics, they have failed to replace or duplicate the commercial success of the conventional mechanical keyboard.

SUMMARY OF THE DISCLOSURE

Image processing techniques for a motion sensitive mechanical keyboard are disclosed. The image processing techniques can improve the user interface experience associated with key-based input devices.

In one embodiment, a motion sensitive mechanical keyboard can utilize orthogonally-oriented cameras to sense hand/finger motion over the surface of the keys. This arrangement can enable a standard look and feel mechanical keyboard to receive command and cursor input (e.g., pointing and gestures) from the user without requiring the user to move the user's hand off the keyboard. The image processing techniques can be utilized to minimize or remove undesirable cursor movement that can occur based on certain detected hand/finger motion from such cameras.

For example, if a camera is oriented on a keyboard in the Y direction (e.g., facing in the direction of keys "2" to "Z" on a standard QWERTY keyboard) to detect inplane motion in the X direction (e.g., motion along the plane of the input surface in the direction of keys "Z" to "M" on a standard QWERTY keyboard), the keyboard can misinterpret a looming motion, in which a hand or finger moves directly toward or away from the camera in the Y direction, as inplane motion in the X direction since edges of the hand or finger can appear to be moving in the X direction based on an image analysis of the looming hand or finger. Accordingly, an image processing technique can be employed that suppresses detected inplane motion when a looming aspect of the detected inplane motion exceeds a particular threshold amount.

An image processing technique can also be employed that suppresses detected inplane motion when a vertical aspect (e.g., in the Z direction relative to the input surface) of the detected inplane motion exceeds a particular threshold amount. In this manner, cursor movement can remain unaffected when a hand or finger lifts off or comes down to the input surface.

DETAILED DESCRIPTION OF THE PREFERRED EMBODIMENTS

In the following description of preferred embodiments, reference is made to the accompanying drawings where it is shown by way of illustration specific embodiments in which the disclosure can be practiced. It is to be understood that other embodiments can be used and structural changes can be made without departing from the scope of the embodiments of this disclosure.

Embodiments of the disclosure relate to image processing techniques for a motion sensitive mechanical keyboard. The image processing techniques can improve the user interface experience associated with key-based input devices. In one embodiment, a motion sensitive mechanical keyboard can utilize orthogonally-oriented cameras to sense hand/finger motion over the surface of the keys. This arrangement can enable a standard look and feel mechanical keyboard to receive command and cursor input (e.g., pointing and gestures) from the user without requiring the user to move the user's hand off the keyboard. The Image processing techniques can be utilized to minimize or remove undesirable cursor movement that can occur based on certain detected hand/finger motion from such cameras.

Although some embodiments of this disclosure may be described and illustrated herein in terms of an input device associated with a mechanical keyboard, it should be understood that embodiments of this disclosure are not so limited, but are generally applicable to any type of input device with planar input surfaces, such as the other types of keyboards enumerated above or other types of planar surfaces that can be used in combination with a camera based architecture as described herein. Further, although some embodiments of this disclosure may be described and illustrated herein in terms of an input device associated with a standalone computer keyboard, it should be understood that embodiments of this disclosure are not so limited, but are generally applicable to input devices associated with any device or structure, such as automated teller machines (ATMs), kiosks/information booths, key pads, automated check-in terminals at airports, automated check-out machines at retail stores, etc.

Figure 1:
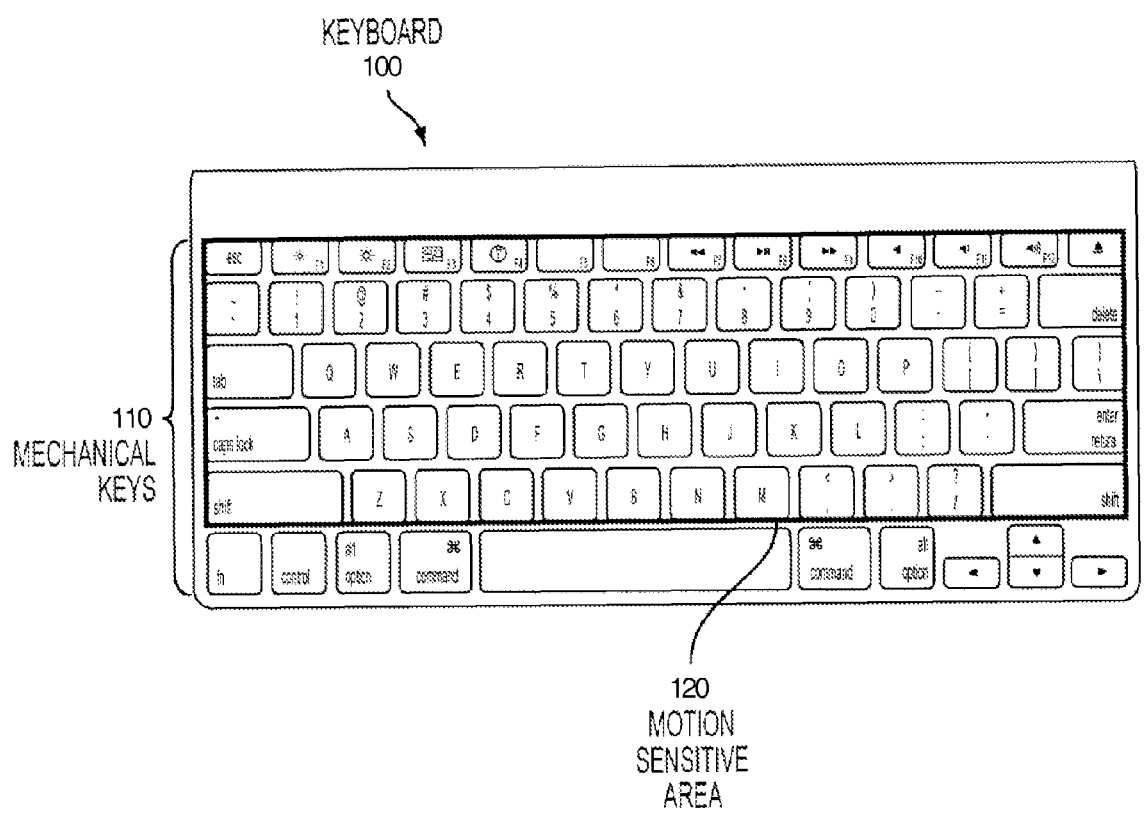
FIG. 1 illustrates an exemplary motion sensitive mechanical keyboard according to an embodiment of the disclosure.

FIG. 1 illustrates motion sensitive mechanical keyboard 100 having mechanical keys 110 and motion sensitive area 120 spanning all of keys 110 except for the bottom-most row. In other embodiments, motion sensitive area 120 can span all keys 110 or any region of keys 110 on keyboard 100. To maximize the likelihood of acceptance with the general population, keyboard 100 has the look and feel of a conventional keyboard. By integrating hand/finger motion tracking input capability into keyboard 100 without altering its overall appearance or, more importantly, the familiar way in which it is used for typing, most of the benefits of a gesture-based input capability can be realized without having any negative impact on the user's text entry experience. Cursor input functions, such as point, click, scroll, drag, select and zoom for example, can be enabled with keyboard 100 such that the user can invoke any one of these functions without moving the user's hands off keyboard 100. These functions, and more, can be driven by hand/finger motion while the fingers are sliding over and touching keys 110 of keyboard 100.

Keyboard 100 can operate in two or more distinct modes in one embodiment: e.g., a typing mode and a mouse mode. While in typing mode, the normal movement of objects such as hands and fingers can be ignored by the motion sensing circuitry. This ensures that nothing unexpected happens like the cursor moving, the page scrolling, or the screen zooming as the user moves the user's fingers across the keys while typing. In typing mode, keyboard 100 operates as normal, accepting single key taps as text or number inputs, for example. Modifier key, hot key, and function key input also operate as normal in typing mode. In other words, keyboard 100 functions and feels just like one would expect a conventional mechanical keyboard to function and feel when in typing mode.

In mouse mode, typing, for the most part, can be disabled. In mouse mode, motion sensing circuitry associated with keyboard 100 can track the movement of the user's hands/fingers in order to provide cursor input, such as moving the cursor, scrolling, dragging or zooming, for example, with a one-to-one correlation between hand/finger motion and the desired action of moving something on the screen. Either hand can be used to guide the motion of the on-screen action. As a result, left-handed users can provide cursor input just as easily as right-handed users can.

In typing mode, the keys can be tapped one at a time (except when modifier keys are used, for example) and the hand/finger motion accompanying the typing execution can be ignored by the motion sensing circuitry.

Separating the function of keyboard 100 into two or more distinct modes that the user deliberately invokes has the advantage of eliminating the chance that random or postural changes in hand/finger position can be misinterpreted as a cursor input (e.g., point, scroll, drag, zoom). In this manner, keyboard 100 does not need to determine when the user intends to issue commands to control screen activities (e.g., scrolling) because the user informs keyboard 100 of the user's intent by switching modes. Mode switching can be implemented in various ways. In some embodiments, mode switching can be implemented in ways that do not require the user to look down at keyboard 100, thereby improving the user experience. In one embodiment, a dedicated "mouse" key can be provided such that mouse mode is entered for the duration that the mouse key is held down. In another embodiment, the dedicated mouse key can include a "sticky" key, such that a tap of the key switches between modes. In a further embodiment, the modes can be switched when the user concurrently taps an arbitrary combination of the keys. For example, in one embodiment, the arbitrary combination of the keys can include any four of keys 110. In another embodiment, the arbitrary combination of the keys can be restricted to adjacent keys in order to effect the mode switch.

Figure 2:
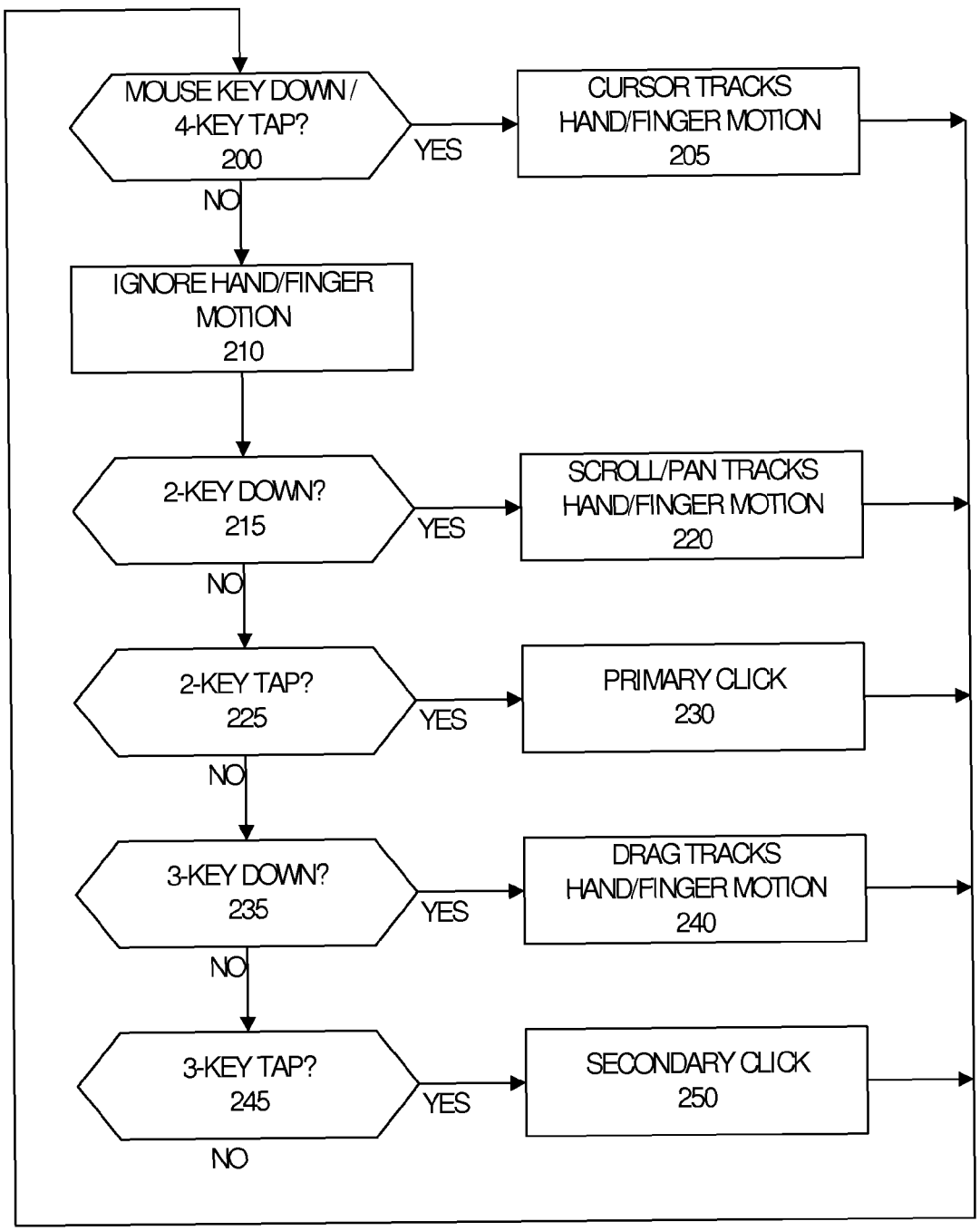
FIG. 2 illustrates an exemplary process for providing cursor input with a motion sensitive mechanical keyboard according to an embodiment of the disclosure.

FIG. 2 illustrates a process for switching between typing and mouse operations using keyboard 100. In mouse mode in the illustrated embodiment, the hand that is not being used for pointing or gesturing can hold down a number of adjacent keys (e.g., 2, 3, or 4) while the other hand/fingers move about the keyboard surface and are tracked by the motion sensing circuitry. For example, while a dedicated mouse key is held down or if a 4-key tap occurs (block 200), keyboard 100 can enter mouse mode such that motion sensing circuitry tracks hand/finger motion (block 205). If not, keyboard 100 can remain in typing mode and hand/finger motion can be ignored (block 210). While two keys are held down (block 215), motion sensing circuitry can track hand/finger motion to effect a pan (for detected horizontal motion) and scroll (for detected vertical motion) (block 220). Keyboard 100 can also interpret a two-key tap (block 225) as a primary click (similar to a left click on a conventional mouse) (block 230). While three keys are held down (block 235), the motion sensing circuitry can track hand/finger motion to effect a drag operation (similar to a click-hold and drag operation by a conventional mouse) (block 240). Keyboard 100 can also interpret a three-key tap (block 245) as a secondary click (similar to a right click on a conventional mouse) (block 250).

It is noted that any suitable number of keys may be utilized in the key tap and hold down operations described in the embodiments illustrated in FIG. 2. The keys may be dedicated (i.e., the same keys can be required to effect the designated operation) or arbitrary (i.e., any of the specified number of keys on keyboard 100—or in any region of keyboard 100—can effect the designated operation). In another embodiment, keyboard 100 can allow non-adjacent keys to effect the described key tap and hold down operations. It is also noted that a user need not explicitly enter mouse mode prior to effecting the operations described in blocks 220, 230, 240 and 250.

Figure 3A:
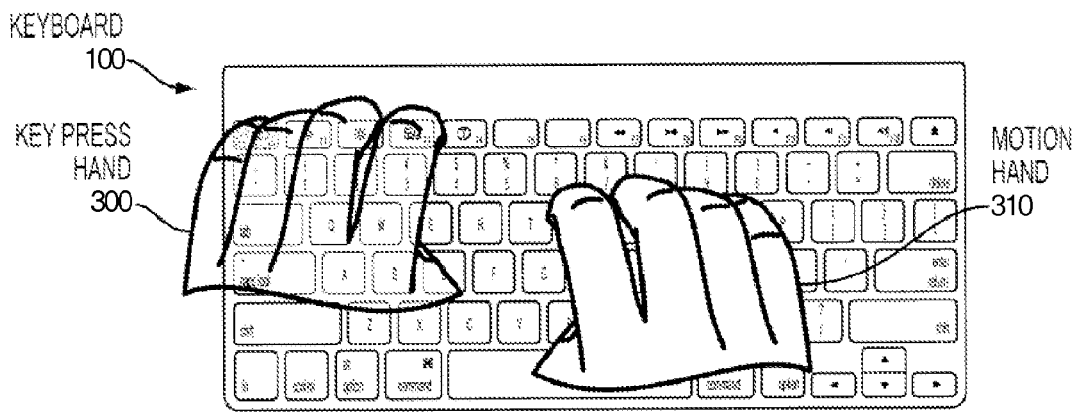
FIGS. 3A-3C illustrate exemplary hand controls for operating a motion sensitive mechanical keyboard according to embodiments of the disclosure.
Figure 3B:
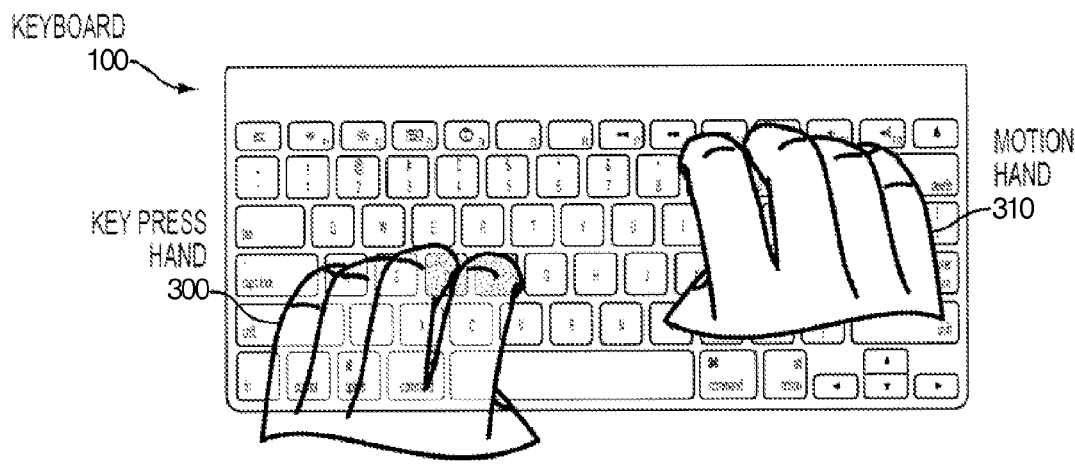
Figure 3C:
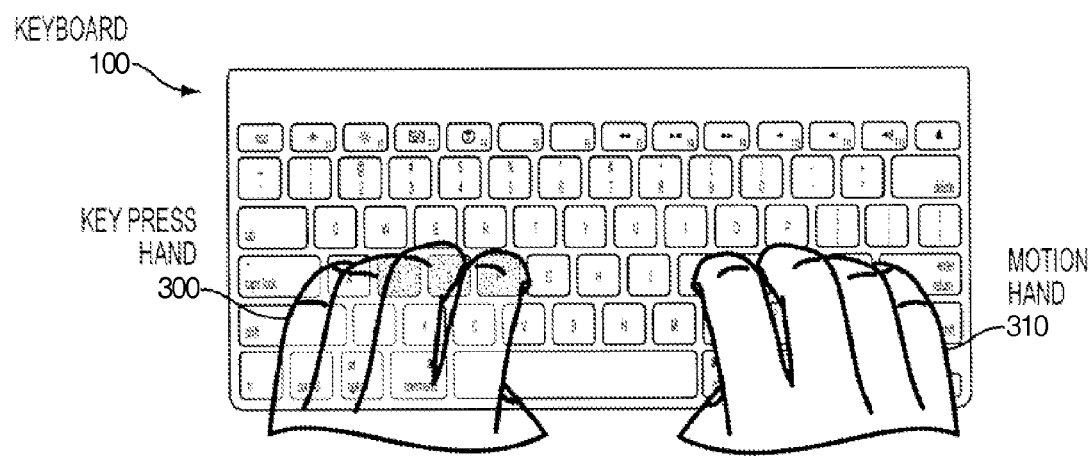

FIGS. 3A-3C illustrate examples of pointing (FIG. 3A), scrolling/panning (FIG. 3B), and dragging (FIG. 3C) according the embodiments of the present disclosure. In FIG. 3A, key press hand 300 can hold down a mouse-key while the hand/finger movement of motion hand 310 can be tracked by the motion sensing circuitry, which can cause the cursor to follow the hand/finger movement. In FIG. 3B, key press hand 300 can hold down two adjacent keys while the hand/finger movement of motion hand 310 can be tracked by the motion sensing circuitry. Up and down movement can control scroll while left and right movement can control pan. In FIG. 3C, key press hand 300 hand can hold down three adjacent keys while the hand/finger movement of motion hand 310 can be tracked by the motion sensing circuitry. The hand/finger movement can control the drag function.

As described above in connection with selection operations, tapping two adjacent keys can produce a primary mouse click, while tapping three adjacent keys can produce a secondary mouse click. To illustrate how this works, presume the user enters mouse mode by holding down the mouse-key with the user's left pinky finger. The cursor can then follow the movement of the user's right hand and fingers. When the user has moved the cursor to the intended target and is ready to click on it, the user can release the mouse key. This can stop the motion sensing circuitry from tracking the user's hand/finger motion. The user can tap two adjacent keys to enter a primary mouse click. Either hand can be used to tap the two keys, and, if desired, the user does not have to release the mouse key to invoke a mouse click. Not releasing the mouse key may introduce some risk that the cursor could move before the two keys are tapped, but some users may be able to do so without a problem. The whole operation of pointing, releasing the mouse key, and tapping two adjacent keys is smooth, fast, and easy to coordinate.

Other functions can be supported in addition to the commonly used cursor input functions of point, scroll, drag, and zoom. For example, hand rotation and hand expansion/contraction gestures can be used for zooming and/or opening and closing files; hand swipes and slides can be used to accelerate operations like text cursor positioning; and two-hand motion monitoring can be used by employing a sticky mouse-key which enables both hands to provide cursor input motion in mouse mode.

Figure 4:
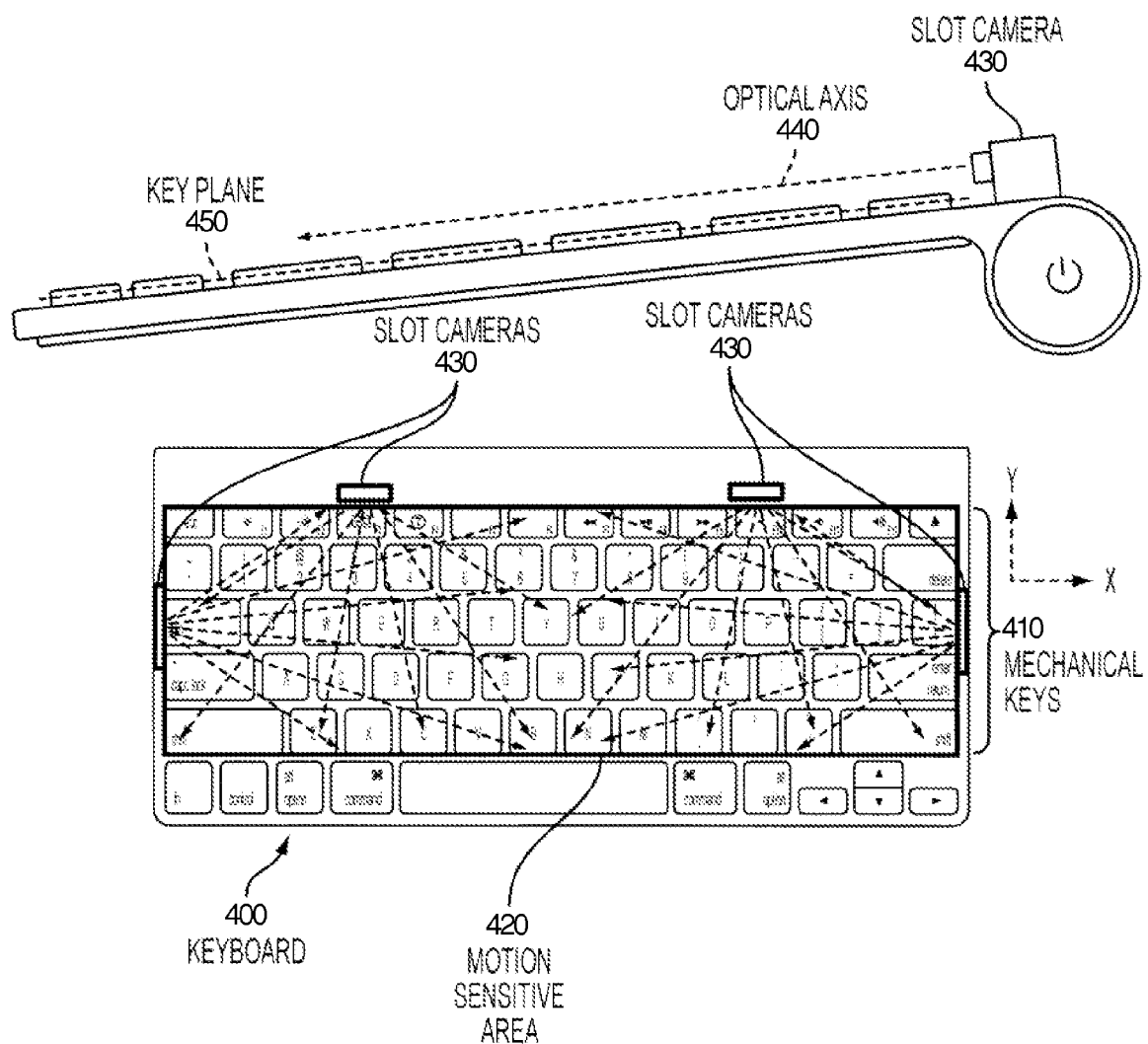
FIG. 4 illustrates an exemplary in-keyboard plane slot camera configuration for surface monitoring a motion sensitive mechanical keyboard according to an embodiment of the disclosure.

Motion sensing associated with keyboard 100 can be implemented with optical sensing using an in-keyboard-plane slot camera system. An exemplary in-keyboard-plane slot camera system is illustrated in FIG. 4. In this embodiment, four slot cameras 430 can be used to track the XYZ motion of the user's hands/fingers. Slot camera 430 can be, for example, a video camera that has a standard aspect ratio or a special high aspect ratio camera that reduces the number of pixel rows such that the field of view is reduced in the Z direction (i.e., perpendicular to the surface of key plane 450). In other words, the imaging array can be organized such that most of slot camera 430's pixels are dedicated to imaging in key plane 450 (i.e., XY) and fewer pixels are dedicated to imaging perpendicular to the plane (i.e., Z). The optical sensors of slot cameras 430 can be oriented toward keys 410 such that their optical axes are parallel to key plane 450. Suitable image analysis techniques, such as techniques employing edge detection algorithms for example, can be utilized to detect the motion of the user's hands/fingers. Such detection can be based on a pixel row or rows parallel to key plane 450, for example.

As illustrated in FIG. 4, slot cameras 430 can be arranged two on the left and two on the right to capture the XYZ motion of the respective hands/fingers. The arrows in FIG. 4 attempt to illustrate the field of view of cameras 430. An advantage of this slotted camera system is that the cameras are always in the correct position, and can be of low profile (in an embodiment as illustrated in FIG. 4 in which cameras 430 are disposed on the surface of keyboard 100 and oriented toward keys 410) and even hidden in the keyboard enclosure (in an embodiment in which mirrors embedded in projections arising from a surface of keyboard 100 orient cameras 430 toward keys 410). Additionally, Z data can be provided which can be used for cursor input operations that discriminate between hands/fingers resting on keys 410 and the hands/fingers being lifted off keys 410.

In one embodiment, all of the cameras 430 that together cover the entire keyboard can be enabled to sense motion in mouse mode. In another embodiment, the cameras 430 that cover a certain portion of the keyboard (e.g., the right side) can be enabled to sense motion in mouse mode, while the cameras 430 that cover another portion of the keyboard (e.g., the left side) can be disabled from sensing motion in mouse mode. This can enable the motion sensing circuitry to focus only on the hand/fingers to be tracked in mouse mode. For example, if a right-handed user depresses keys with the left hand on the left side of the keyboard to enter into mouse mode, then the cameras covering the left side of the keyboard can be disabled while the cameras covering the right side of the keyboard can be enabled for sensing motion of the user's right hand. Conversely, if a left-handed user depresses keys with the right hand on the right side of the keyboard to enter into mouse mode, then the cameras covering the right side of the keyboard can be disabled while the cameras covering the left side of the keyboard can be enabled for sensing motion of the user's left hand.

Figure 5:
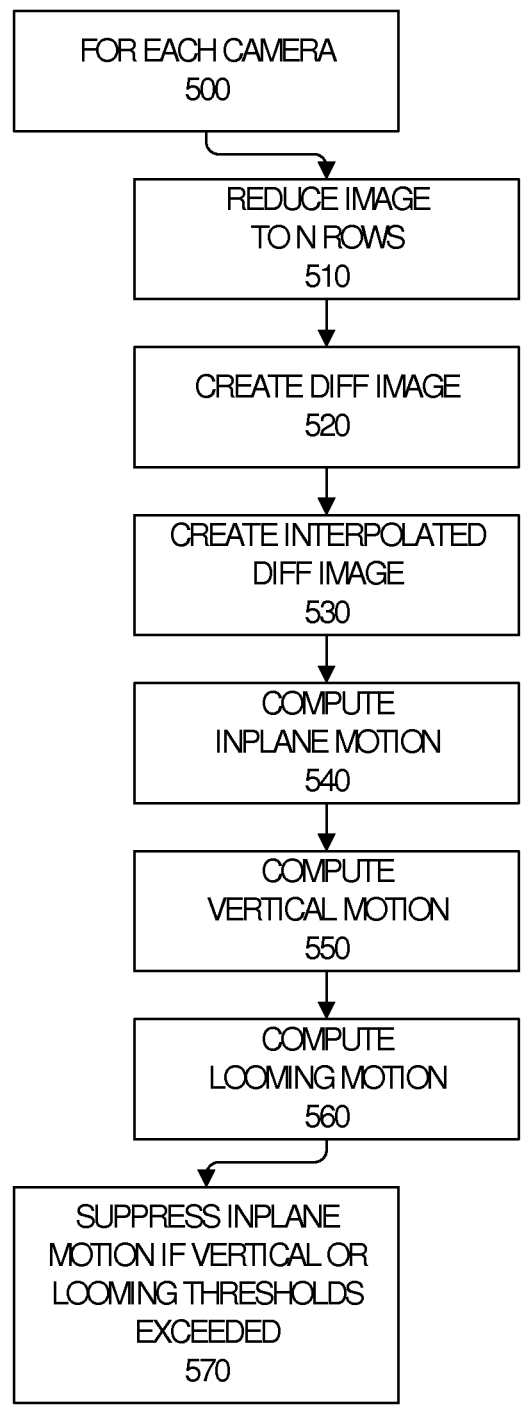
FIG. 5 illustrates an exemplary process for detecting motion according to an embodiment of the disclosure.

FIG. 5 illustrates an exemplary image processing technique that a processor can utilize to minimize or remove undesirable cursor movement that can occur based on certain detected hand/finger motion from such cameras.

For example, if a camera is oriented on a keyboard in the Y direction (e.g., facing in the direction of keys "2" to "Z" on a standard QWERTY keyboard) to detect inplane motion in the X direction (e.g., motion along the plane of the input surface in the direction of keys "Z" to "M" on a standard QWERTY keyboard), the keyboard can misinterpret a looming motion, in which a hand or finger moves directly toward or away from the camera in the Y direction, as inplane motion in the X direction since edges of the hand or finger can appear to be moving in the X direction based on an image analysis of the looming hand or finger. Accordingly, an image processing technique can be employed that suppresses detected inplane motion when a looming aspect of the detected inplane motion exceeds a particular threshold amount. An image processing technique can also be employed that suppresses detected inplane motion when a vertical aspect (e.g., in the Z direction relative to the input surface) of the detected inplane motion exceeds a particular threshold amount. In this manner, cursor movement can remain unaffected when a hand or finger lifts off or comes down to the input surface.

As illustrated in the embodiment of FIG. 5, for each camera (block 500), a processor can reduce an image (e.g., a 512×512 pixel image) captured by that camera to a subset of rows (e.g., 40) as described above (block 510), create a difference image by subtracting the values of pixels from the captured image from the values of corresponding pixels from an image captured in a previous frame (block 520), create an interpolated difference image by adding more pixels (e.g., generating a 2000×2000 pixel image from the 512×512 pixel image) to boost resolution (block 530), compute inplane motion (block 540), compute vertical motion (block 550) and compute looming motion (block 560). The processor can suppress inplane motion for a particular camera that is orthogonal to that camera's optical axis if a looming threshold is exceeded, and/or suppress all inplane motion for all cameras if a vertical threshold is exceeded (block 570). The use of a difference image can improve performance of the motion detection because it subtracts out all information in an image that is not in motion.

Figure 6:
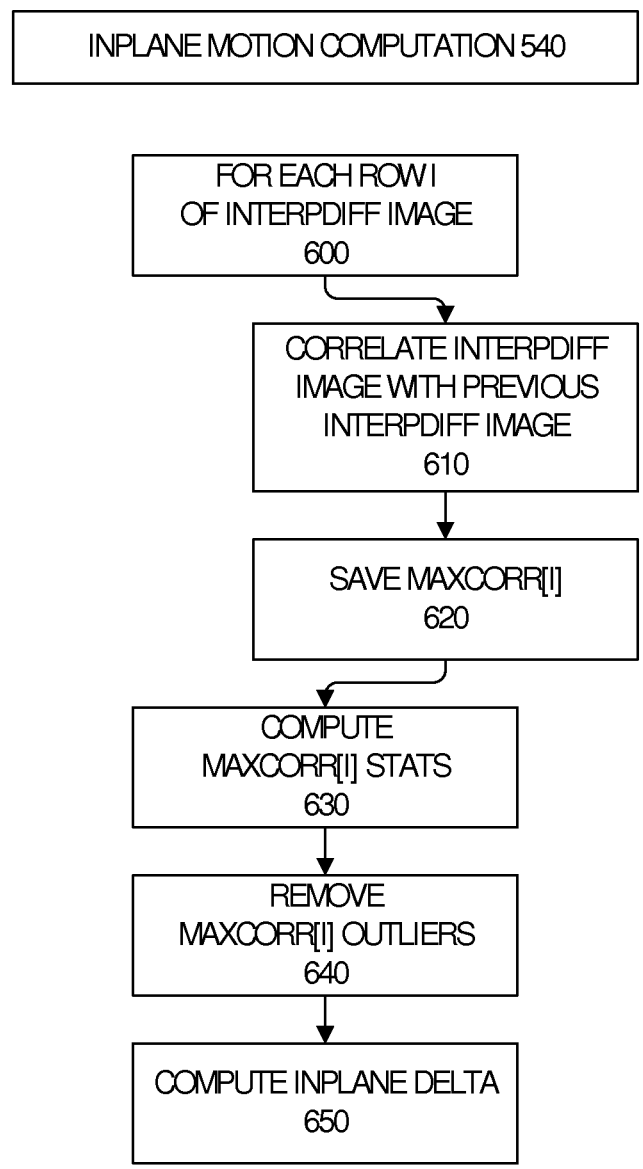
FIG. 6 illustrates an exemplary process for computing inplane motion according to an embodiment of the disclosure.

FIG. 6 illustrates an exemplary process for computing an inplane motion computation as described above in connection with block 540 for a particular camera. In the embodiment illustrated in FIG. 6, for each row of the interpolated difference image (block 600), the processor can correlate the interpolated difference image with a previous interpolated difference image (block 610) to determine a maximum correlation value corresponding to the pixelated distance that an object or objects have moved in that row, and save the maximum correlation value (block 620). This correlation process can be implemented in any suitable manner. In a general sense, the correlation process can entail sliding a row vector of the current interpolated difference image across a corresponding row vector of the previous interpolated difference image to determine the maximum pixelated distance between the two matching vector representations of the one or more objects. After this process has been completed for each row, the processor can perform a statistical analysis of the saved maximum correlation values for each row vector (block 630), remove any outliers (block 640), and compute the inplane delta indicating how far (e.g., how many pixels) the one or more objects have moved between difference images (block 650).

Figure 7:
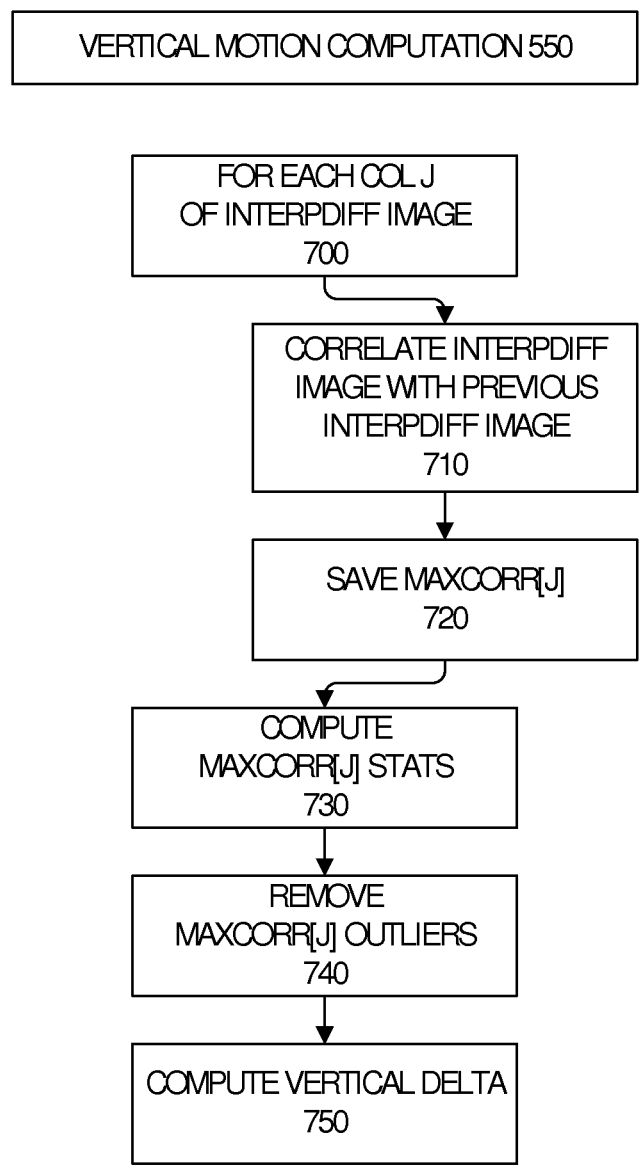
FIG. 7 illustrates an exemplary process for computing vertical motion according to an embodiment of the disclosure.

FIG. 7 illustrates an exemplary process for computing a vertical motion computation as described above in connection with block 550 for a particular camera. The vertical motion computation can be similar to the inplane motion computation described above, except that column vectors of the difference images can compared and analyzed instead of row vectors. In particular, in the embodiment illustrated in FIG. 7, for each column of the interpolated difference image (block 700), the processor can correlate the interpolated difference image with a previous interpolated difference image (block 710) to determine a maximum correlation value corresponding to the pixelated distance that an object or objects have moved in that column, and save the maximum correlation value (block 720). This correlation process can be implemented in any suitable manner as described above, such as sliding a column vector of the current interpolated difference image across a corresponding column vector of the previous interpolated difference image to determine the maximum pixelated distance between the two matching vector representations of the one or more objects. After this process has been completed for each column, the processor can perform a statistical analysis of the saved maximum correlation values for each column vector (block 730), remove any outliers (block 740), and compute the vertical delta indicating how far (e.g., how many pixels) the one or more objects have moved between difference images (block 750).

Figure 8:
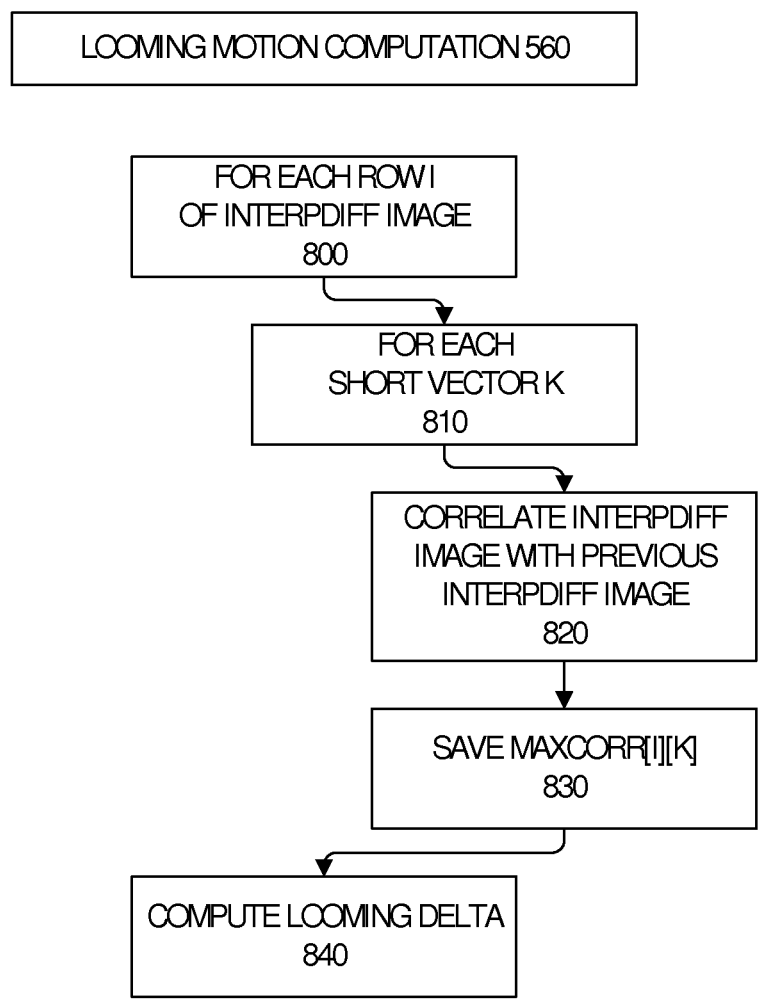
FIG. 8 illustrates an exemplary process for computing looming motion according to an embodiment of the disclosure.

FIG. 8 illustrates an exemplary process for computing a looming motion computation as described above in connection with block 560 for a particular camera. The looming motion computation can be similar to the inplane motion computation described above, except that multiple short vectors or blocks of pixels (e.g., 8 or 16 pixels wide) in each row (e.g., 512 pixels wide) of the difference images can be compared and analyzed instead of a single long vector formed of the entire row (e.g., 512 pixels in a 512×512 pixel image) or mostly the entire row. In particular, in the embodiment illustrated in FIG. 8, for each row (block 800) and short vector within the row (block 810) of the interpolated difference image, the processor can correlate the interpolated difference image with a previous interpolated difference image (block 820) to determine a maximum correlation value corresponding to the pixelated distance that an object or objects have moved in that short vector within the row, and save the maximum correlation value (block 830). This correlation process can be implemented in any suitable manner as described above, such as sliding the short vector within the row of the current interpolated difference image across the corresponding short vector with that row of the previous interpolated difference image to determine the maximum pixelated distance between the two matching short vector representations of the one or more objects or portions thereof. After this process has been completed for each short vector within each row, the processor can compute the looming delta by summing the maximum correlation values of each short vector in each row and performing a statistical analysis of the summed values (block 840).

Edges of looming objects, which can each be reflected by a particular short vector within a row, can appear to be move in opposite directions as they get closer or move directly away from a camera. Since positive correlation values can reflect movement of short vectors in one direction while negative values can reflect movement of short vectors in the opposite direction, sums and a looming delta near zero or within a certain threshold of zero can indicate that the motion has a significant looming aspect to it.

Figure 9:
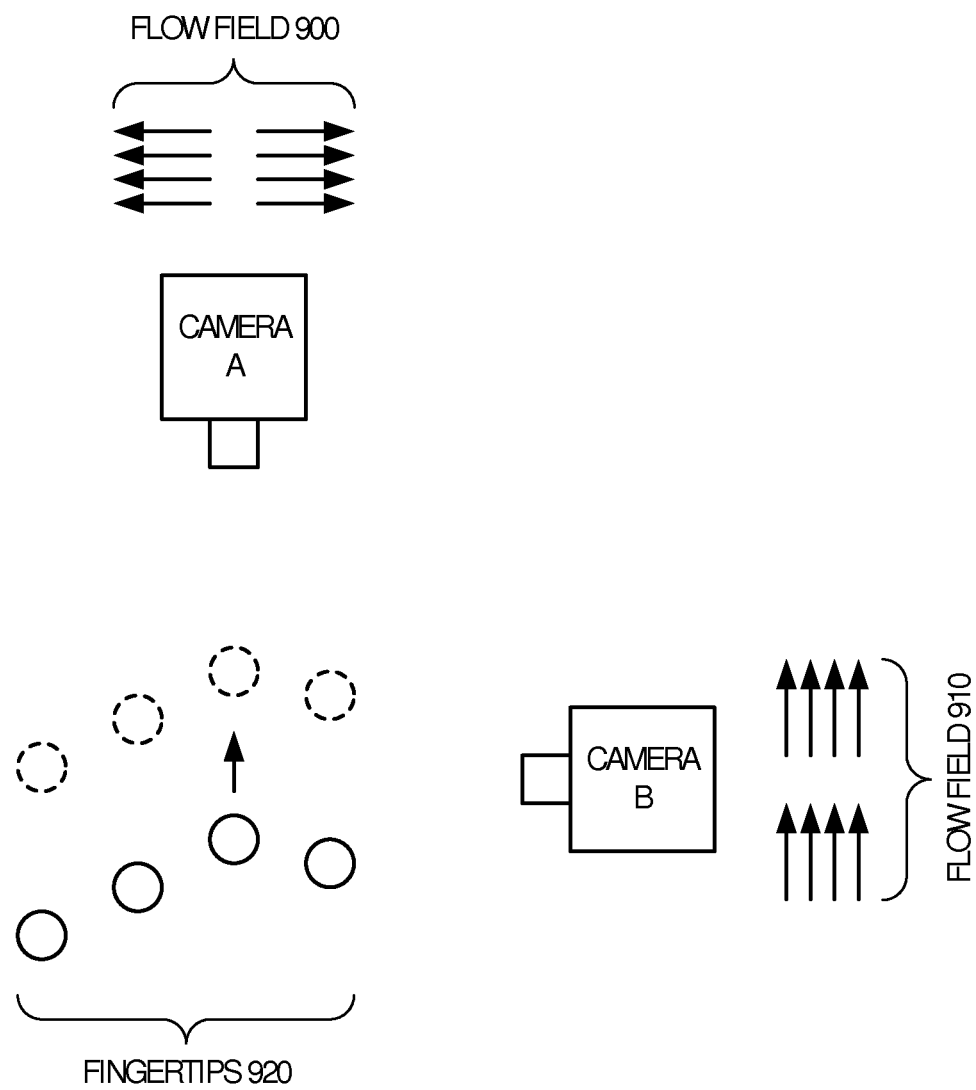
FIGS. 9-11 illustrate an exemplary camera based motion tracking architecture according to an embodiment of the disclosure.
Figure 10:
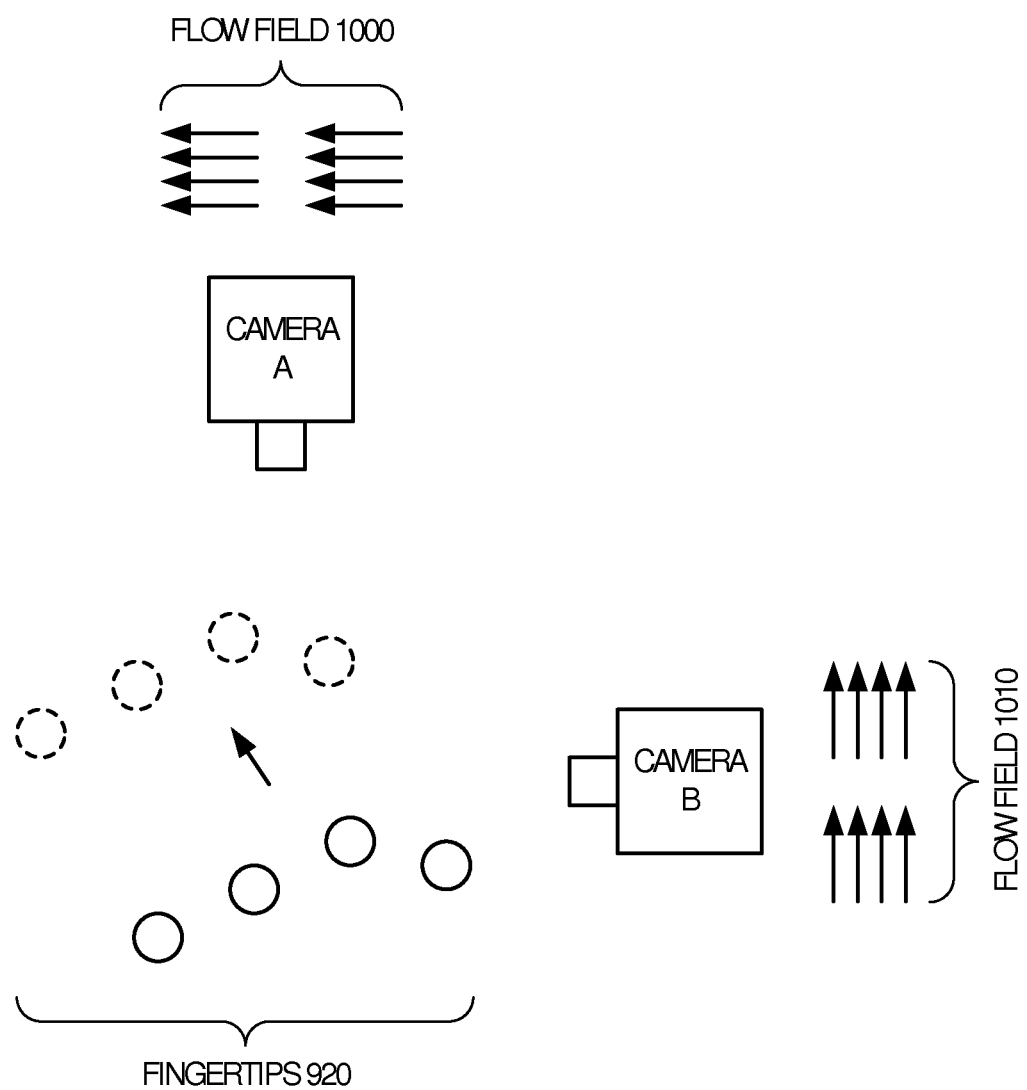
Figure 11:
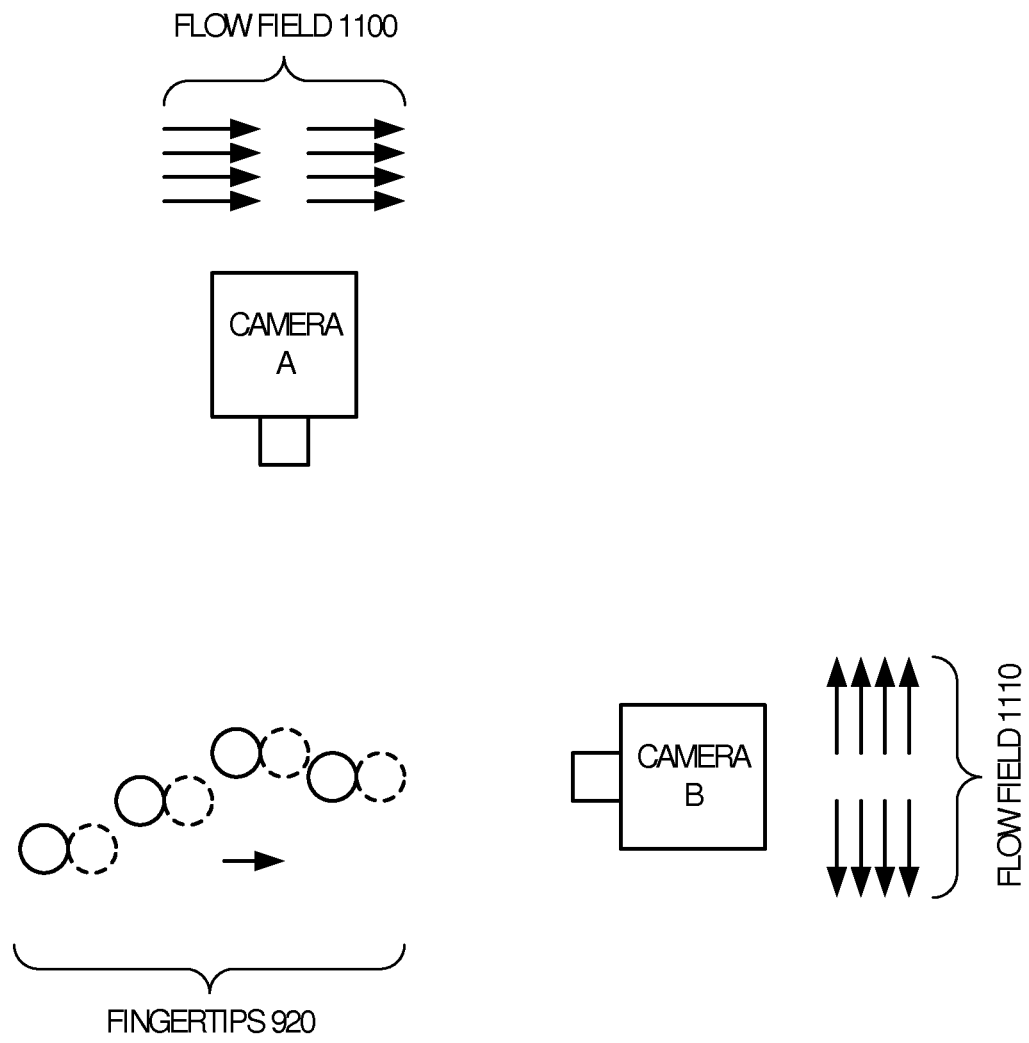

FIGS. 9-11 illustrate an exemplary camera based motion tracking architecture in which cameras A and B can be configured as described above in connection with FIGS. 5-8 to detect the inplane motion of fingertips 920 in contact with an input surface. For purposes of illustration, the solid circles of fingertips 920 indicate a starting position of their motion and the dotted circles of fingertips 920 indicate an ending position of their motion. Vertical motion is not illustrated, although cameras A and B can be configured to suppress detected inplane motion when a vertical aspect of the fingertip motion exceeds a particular threshold amount.

In FIG. 9, since fingertips 920 move only in the +Y direction, which is orthogonal to the optical axis of camera B, camera B can compute a positive inplane delta reflecting the distance of the motion in the +Y direction, and compute a non-zero looming delta since, as reflected in flow field 910, each short vector associated with fingertips 920 can be determined to be moving in the same direction. Accordingly, since a looming aspect of the detected inplane motion associated with camera B does not exceed a particular threshold (e.g., remains outside a certain threshold of zero), the detected inplane motion in the +Y direction can be reported out to a host or other entity and not be suppressed.

Further, since fingertips 920 move only in the +Y direction in FIG. 9, which is parallel to the optical axis of camera A, camera A can compute an indeterminate inplane delta reflecting some distance of the motion in the X direction, but compute a zero or near-zero looming delta since, as reflected in flow field 900, the short vectors associated with fingertips 920 can be determined to be moving in opposite directions on balance. Accordingly, since a looming aspect of the detected inplane motion associated with camera A exceeds a particular threshold (e.g., meets or falls inside a certain threshold of zero), the detected inplane motion in the X direction can be suppressed and consequently not reported out to a host or other entity.

In FIG. 10, since fingertips 920 move in the +Y direction, camera B can compute a positive inplane delta reflecting the distance of the motion in the +Y direction, and compute a non-zero looming delta since, as reflected in flow field 1010, each short vector associated with fingertips 920 can be determined to be moving in the same direction. Accordingly, since a looming aspect of the detected inplane motion associated with camera B does not exceed a particular threshold (e.g., remains outside a certain threshold of zero), the detected inplane motion in the +Y direction can be reported out to a host or other entity and not be suppressed.

Further, since fingertips 920 also move in the −X direction in FIG. 10, camera A can compute a negative inplane delta reflecting the distance of the motion in the −X direction, and compute a non-zero looming delta since, as reflected in flow field 1000, each short vector associated with fingertips 920 can be determined to be moving in the same direction. Accordingly, since a looming aspect of the detected inplane motion associated with camera A does not exceed a particular threshold (e.g., remains outside a certain threshold of zero), the detected inplane motion in the −X direction can be reported out to a host or other entity and not be suppressed.

In FIG. 11, since fingertips 920 move only in the +X direction, which is parallel to the optical axis of camera B, camera B can compute an indeterminate inplane delta reflecting some distance of the motion in the Y direction, but compute a zero or near-zero looming delta since, as reflected in flow field 1110, the short vectors associated with fingertips 920 can be determined to be moving in opposite directions on balance. Accordingly, since a looming aspect of the detected inplane motion associated with camera B exceeds a particular threshold (e.g., meets or falls inside a certain threshold of zero), the detected inplane motion in the Y direction can be suppressed and consequently not reported out to a host or other entity.

Figure 12:
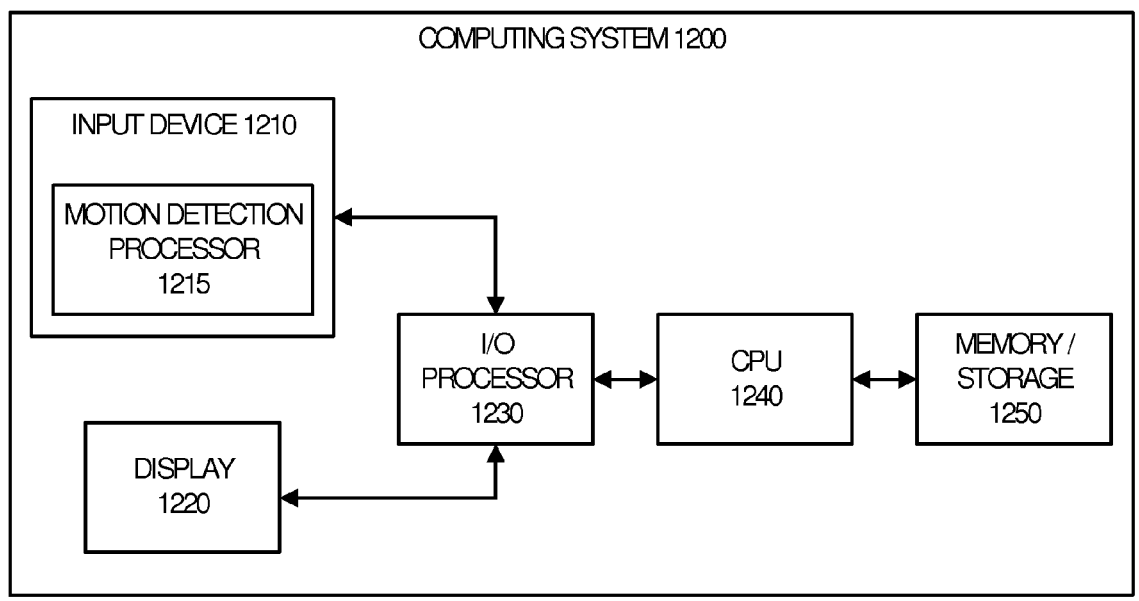
FIG. 12 illustrates an exemplary computing system including an input device according to embodiments of the disclosure.

Further, since fingertips 920 move only in the +X direction in FIG. 11, which is orthogonal to the optical axis of camera A, camera A can compute a positive inplane delta reflecting the distance of the motion in the +X direction, and compute a non-zero looming delta since, as reflected in flow field 1100, each short vector associated with fingertips 920 can be determined to be moving in the same direction. Accordingly, since a looming aspect of the detected inplane motion associated with camera A does not exceed a particular threshold (e.g., remains outside a certain threshold of zero), the detected inplane motion in the +X direction can be reported out to a host or other entity and not be suppressed FIG. 12 illustrates exemplary computing system 1200 that can implement embodiments of the disclosure as described above. Computing system 1200 can include input device 1210, display 1220, I/O processor 1230, central processing unit (CPU) 1240 and memory/storage 1250. Input device 1210 can correspond to a motion sensitive mechanical keyboard such as keyboard 100 described above, and can include motion detection processor 1215 to process the video data stream(s) to track the movement of hands and fingers engaging input device 1210 as described above. Programming for processing the input captured by input device 1210 may be stored in memory/storage 1250 of computing system 1200, which may include solid state memory (RAM, ROM, etc.), hard drive memory, and/or other suitable memory or storage. CPU 1240 may retrieve and execute the programming to process the input received through input device 1210. Through the programming, CPU 1240 can receive outputs from input device 1210 and perform actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. CPU 1240 can also perform additional functions that may not be related to input device processing, and can be coupled to memory/storage 1250 and display 1220, which may include a liquid crystal display (LCD) for example, for providing a user interface (UI) to a user of the device.

Note that one or more of the functions described above can be performed by firmware stored in a memory (not shown) associated with motion detection processor 1215 and executed by motion detection processor 1215, stored in a memory (not shown) associated with I/O processor 1230 and executed by I/O processor 1230, or stored in memory/storage 1250 and executed by CPU 1240. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store a program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 13A:
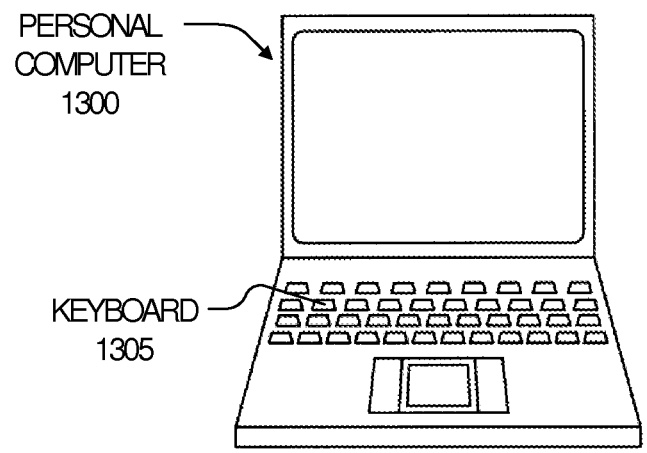
FIGS. 13A and 13B illustrate exemplary personal computers having a motion sensitive mechanical keyboard according to embodiments of the disclosure.
Figure 13B:
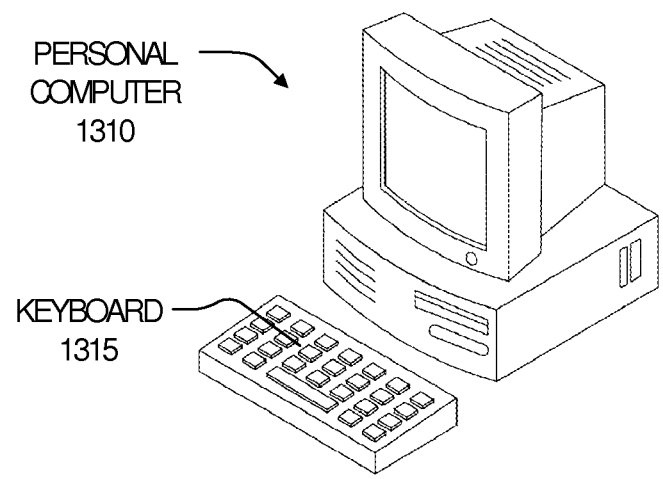

Computing system 1200 can be any of a variety of types employing image processing techniques for a motion sensitive mechanical keyboard, such as those illustrated in FIGS. 13A-13B, for example. FIGS. 13A and 13B illustrate exemplary personal computers 1300 (in a laptop configuration) and 1310 (in a desktop system configuration) that can employ image processing techniques in combination with motion sensitive mechanical keyboards 1305 and 1315, respectively, according to embodiments of the disclosure. The personal computers of FIGS. 13A-13B can achieve an improved user interface by utilizing image processing techniques according to embodiments of the disclosure.

It will be appreciated that the above description for clarity has described embodiments of the disclosure with reference to different functional units. However, it will be apparent that any suitable distribution of functionality between different functional units may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An input device comprising:
 an input surface aligned with a plane;
 an optical sensor oriented toward the input surface, the optical sensor having an optical axis parallel to the plane and configured to detect an inplane aspect of a motion along the input surface and orthogonal to the optical axis, a vertical aspect of the motion towards or away from the input surface, and a looming aspect of the motion along the input surface and parallel to the optical axis; and
 one or more processors configured to process the vertical aspect of the motion and the looming aspect of the motion without processing the inplane aspect of the motion if the detected vertical or looming aspect of the motion exceeds a threshold amount.

2. The input device of claim 1, wherein the optical sensor includes a camera configured to capture an image along the input surface.

3. The input device of claim 2, wherein the one or more processors are configured to analyze difference images based on images captured by the camera to determine whether the detected vertical aspect or looming aspect exceeds the threshold amount.

4. The input device of claim 1, wherein the input surface comprises a mechanical keyboard.

5. The input device of claim 1, wherein the input device is part of a personal computer.

6. The input device of claim 1, wherein the one or more processors are configured to detect a vertical aspect of motion relative to the input surface.

7. A computing system comprising:
 a keyboard comprising
  multiple mechanical keys aligned in a plane;
  multiple optical sensors oriented toward the keys, each optical sensor having an optical axis parallel to the plane and configured to detect a first aspect, a second aspect, and a third aspect of a motion along the input surface, wherein
   the first aspect of the motion corresponds to a distance in a first direction parallel to the plane and orthogonal to one of the optical axes,
   the second aspect of the motion corresponds to distance in a second direction orthogonal to the plane, and
   the third aspect of the motion corresponds to a distance in a third direction parallel to the plane and parallel to the one of the optical axes; and
 one or more processors configured to process the second aspect of the motion and the third aspect of the motion without processing the first aspect of the motion if the second aspect of the motion or the third aspect of the motion exceeds a threshold amount.

8. The computing system of claim 7, wherein at least two of the multiple optical sensors are oriented orthogonally to one another.

9. The computing system of claim 7, wherein a first set of the multiple optical sensors are oriented orthogonally to one another and cover a first side of the keyboard, and a second set of the multiple optical sensors are oriented orthogonally to one another and cover a second side of the keyboard.

10. The computing system of claim 9, wherein the keyboard is configured to enable an input mode in which the motion is tracked to provide cursor input, and to disable either the first set or the second set of the multiple optical sensors when the input mode is enabled.

11. The computing system of claim 7, wherein the motion is associated with multiple objects in contact with or in proximity to the keyboard.

12. The input device of claim 6, wherein the optical sensor includes a camera configured to capture an image along the input surface.

13. The input device of claim 12, wherein the one or more processors are configured to analyze difference images based on images captured by the camera to determine whether the detected second aspect or third aspect exceeds the threshold amount.

14. A computing system, comprising:
a receiving module configured to receive data from an input device, the data received from the input device comprising an inplane aspect of a motion along an input surface of the input device and orthogonal to an optical axes of the input device, a vertical aspect of the motion towards or away from the input surface, and a looming aspect of the motion along the input surface and parallel to the optical axis, wherein the optical axes of the input device being parallel to the input surface; and
a processor configured to process the vertical aspect of the motion and the looming aspect of the motion without processing the inplane aspect of the motion if the detected vertical or looming aspect of the motion exceeds a threshold amount.

15. The computing system of claim 14, wherein the one processor is configured to receive images captured along the input surface of the input device.

16. The computing system of claim 15, wherein the processor is configured to analyze difference images based on the images received to determine whether the detected vertical aspect or looming aspect exceeds the threshold amount.

* * * * *